(12) United States Patent
Hanes et al.

(10) Patent No.: US 11,200,891 B2
(45) Date of Patent: Dec. 14, 2021

(54) COMMUNICATIONS UTILIZING MULTIPLE VIRTUAL ASSISTANT SERVICES

(71) Applicant: HEWLETT-PACKARD DEVELOPMENT COMPANY, L.P., Houston, TX (US)

(72) Inventors: David H. Hanes, Houston, TX (US); John Michael Main, Rio Rancho, NM (US); Jon R. Dory, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 509 days.

(21) Appl. No.: 16/097,727

(22) PCT Filed: Jun. 21, 2016

(86) PCT No.: PCT/US2016/038488
§ 371 (c)(1),
(2) Date: Oct. 30, 2018

(87) PCT Pub. No.: WO2017/222503
PCT Pub. Date: Dec. 28, 2017

(65) Prior Publication Data
US 2020/0402502 A1   Dec. 24, 2020

(51) Int. Cl.
*G10L 15/22* (2006.01)
*G06F 3/16* (2006.01)
*G10L 15/32* (2013.01)

(52) U.S. Cl.
CPC .............. *G10L 15/22* (2013.01); *G06F 3/167* (2013.01); *G10L 15/32* (2013.01); *G10L 2015/223* (2013.01)

(58) Field of Classification Search
CPC ... G10L 15/22; G10L 15/32; G10L 2015/223; G06F 3/167; G06F 17/30; H04H 60/76
See application file for complete search history.

(56) References Cited

U.S. PATENT DOCUMENTS 7,689,232 B1 * 3/2010 Beyer, Jr. .......... H04M 1/72415
                                                            455/457
8,213,910 B2 * 7/2012 Harris .................... G10L 15/26
                                                            455/414.1
(Continued)

FOREIGN PATENT DOCUMENTS

| EP | 2881898 A1 * | 6/2015 | ....... G06F 16/24578 |
| EP | 2881898 A1 | 6/2015 |
| WO | WO-2015086493 | 6/2015 |

OTHER PUBLICATIONS

Kelly, Heather, "Which is the best digital assistant: Siri, Cortana, Alexa or Google Now?", CNN Money, http://money.cnn.com/2015/07/28/technology/digital-assistant-interview/, 5 pages.
(Continued)

*Primary Examiner* — Shaun Roberts
(74) *Attorney, Agent, or Firm* — Michael A. Dryja (57) ABSTRACT

Microphone data indicative of a user spoken phrase is captured utilizing the microphone at a communication apparatus. At least a portion of the microphone data is sent to a set of computing devices. A response phrase determined at a virtual assistant service is received from each of the computing devices. A preferred response phrase is identified among the set of received response phrases according to a preference rule. The preferred response phrase is caused to be output via a speaker at the communication apparatus.

15 Claims, 7 Drawing Sheets

(56) References Cited

U.S. PATENT DOCUMENTS

| | | | |
|---|---|---|---|
| 9,241,068 B2* | 1/2016 | Li | H04W 4/16 |
| 9,691,378 B1* | 6/2017 | Meyers | G10L 15/08 |
| 10,353,906 B2* | 7/2019 | Souche | G06F 16/953 |
| 2007/0016570 A1* | 1/2007 | Punaganti Venkata | G06F 16/9536 |
| 2010/0114944 A1* | 5/2010 | Adler | G10L 15/22 707/770 |
| 2014/0365222 A1* | 12/2014 | Weider | G10L 15/22 704/257 |
| 2015/0169284 A1* | 6/2015 | Quast | G06F 16/9535 704/275 |
| 2015/0169336 A1* | 6/2015 | Harper | G10L 15/22 715/706 |
| 2015/0373183 A1* | 12/2015 | Woolsey | H04M 1/72448 348/14.08 |
| 2016/0260431 A1* | 9/2016 | Dorp | G10L 15/32 |
| 2017/0269975 A1* | 9/2017 | Wood | G10L 15/22 |

OTHER PUBLICATIONS

Vincent, Brittany, "Siri vs. Cortana vs. Google Now: Why Apple's Siri Is Best", Dec. 5, 2014, http://www.tomsguide.com/us/best-voice-assistant,review-2893.html, 29 pages.

* cited by examiner

COMMUNICATIONS UTILIZING MULTIPLE VIRTUAL ASSISTANT SERVICES

BACKGROUND

In today's world, users are increasingly utilizing technology-based devices, including smartphones, tablets, and personal computers, to access voice-accessible virtual assistant functions. Popular virtual assistant functions including providing users with answers to voice-presented questions by accessing search engines, email, SMS, electronic calendars, electronic contacts directories, and other applications.

DETAILED DESCRIPTION

In many cases users may desire to access a virtual assistant service via an application or via the internet to quickly obtain answers to questions regarding the user's calendar, local weather predictions, traffic conditions, sports scores, news, and other information. In some circumstances, a user may carry a handheld computing device such as a smartphone or notebook computer with him or her to multiple locations (e.g., rooms in a dwelling) in order to have accessibility to a virtual assistant service provided by a manufacturer of the handheld computing device.

However, this common scenario has several drawbacks. First, a user carrying a computing device from room to room in a dwelling over a protracted period of time may not be practical in some circumstances due to the user forgetting or being unable to carry the device for a period, the need to use the device for other purposes, battery life, and other factors. Second, the user may find that the virtual assistant service provided by default according to the manufacturer of the handheld computing device (sometimes referred to herein as a "default virtual assistant") is not optimal for all categories of user requests. For instance, a user might find that a more accurate weather prediction can be found utilizing a second virtual assistant that is not the default virtual assistant for the user's mobile device, or may find that a third virtual assistant service that is not the default virtual assistant for the user's mobile device provides more current news coverage than the default virtual assistant. Currently a user desiring to utilize multiple digital assistants might be faced with tracking and keeping records of which digital assistant services will be most optimal for specific topic/request categories, and with purchasing and carrying multiple mobile computing devices in order to access multiple default virtual assistants.

To address these issues, various examples described in more detail below provide an apparatus and a method that enables effective and efficient communication utilizing multiple virtual assistant services. In one example, a communication apparatus is to capture, utilizing a microphone, microphone data indicative of a user spoken phrase. The communication apparatus is to send at least a portion of the microphone data to a set of computing devices that are connected to the communication apparatus via a network, wherein each of the computing devices is to communicate with a server system hosting a distinct virtual assistant service. The communication apparatus is to receive, from each of the computing devices, a response phrase determined at a virtual assistant service. The communication apparatus is to identify a preferred response phrase among the set of received response phrases according to a preference rule. After identifying the preferred response phrase, the communication apparatus is to cause an output, via a speaker included within the communication apparatus, of the preferred response phrase.

In an example, the communication apparatus may identify the preferred response phrase by assigning scores to the received response phrases according to the preference rule. In an example, according to the utilized preference rule a received response phrase that is determined to be successful in providing information relevant to the user spoken phrase is assigned a higher preference than a received response phrase that has been determined as failing to provide information relevant to the user spoken phrase. In a particular example, the success or failure of a received response phrase can be a success or failure determined via utilization of a salient response algorithm. In an example, according to the preference rule a received response phrase that is indicative of an error message is to be assigned a lower preference than a score that would be assigned to a received response phrase not indicative of an error message. In another example, the preference rule to be applied may include as a factor a past predictive success of the virtual assistant services with respect to a particular subject category. In certain examples, the communication apparatus may capture preference data that is indicative of a user preference for a first virtual assistant service, and may identify the preferred response phrase in consideration of the stated user preference. In a particular example, the preference data may be indicative of a user preference for a particular virtual assistant service for a particular subject category, and the communication apparatus may identify the preferred response phrase in consideration of the stated user preference.

In the above examples, the communication apparatus is to send at least a portion of the microphone data to a set of computing devices that are connected to the communication apparatus via a network, and each of the computing devices would in turn communicate with a server system hosting a distinct virtual assistant service, and the communication apparatus would receive from each of the computing devices a response phrase determined at a virtual assistant service. In other examples, however, the communication apparatus may send at least a portion of the captured microphone data directly to a set of server systems, wherein each server system hosts a distinct virtual assistant service, and may receive the response phrases directly from the server systems. In these examples, the communication apparatus is thus not required to connect with any smartphone, tablet computer, laptop computer, desktop computer, or other intermediary computing devices for relaying the of the at least a portion of the microphone data to the server systems, and/or for relaying of response phrases from the server systems back to the communication apparatus.

In this manner, then, the disclosed examples provide a communication method and apparatus that will enable a user to submit a voice query to the communication apparatus and then receive a high quality response phrase determined to be the best response available considering multiple digital assistant services. Users will enjoy the efficiency, ease of use, and cost savings associated with accessing multiple digital assistant services without a need to purchase, maintain, and carry multiple mobile computing devices.

Figure 1:
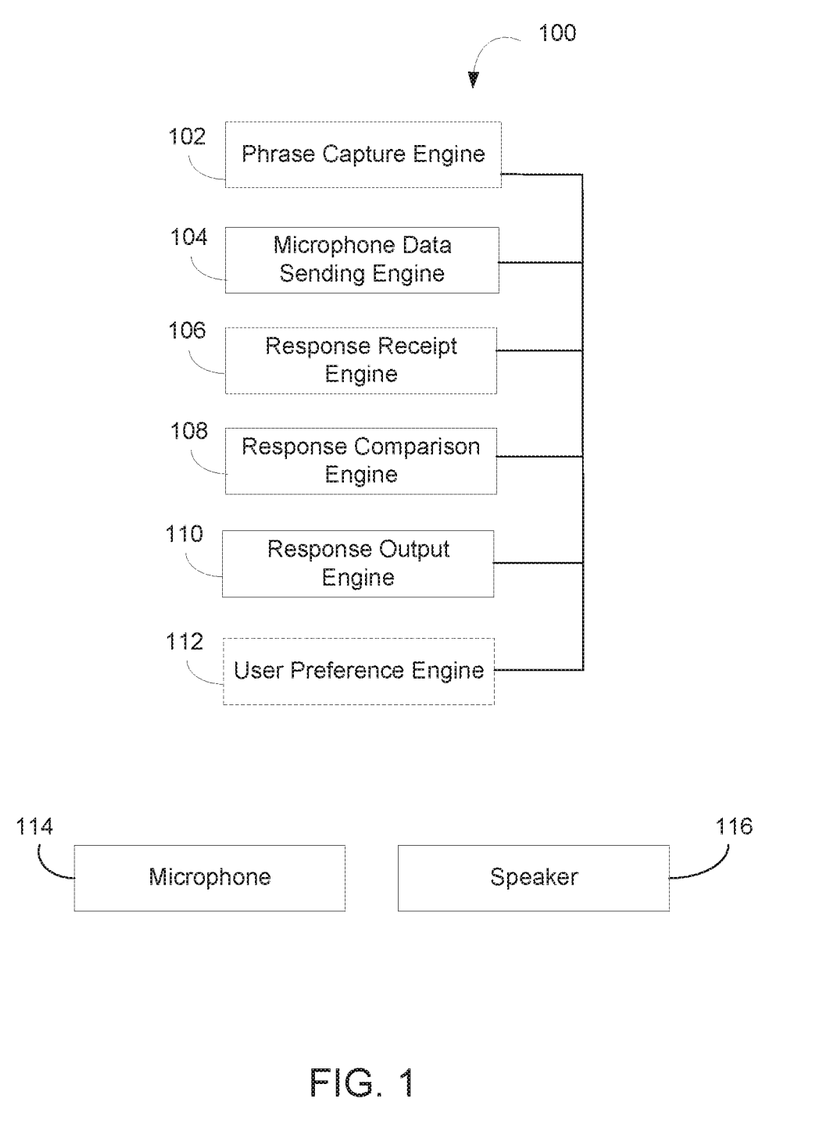
FIG. 1 is a block diagram depicting an example of an apparatus to enable communication utilizing multiple virtual assistant services.
Figure 2:
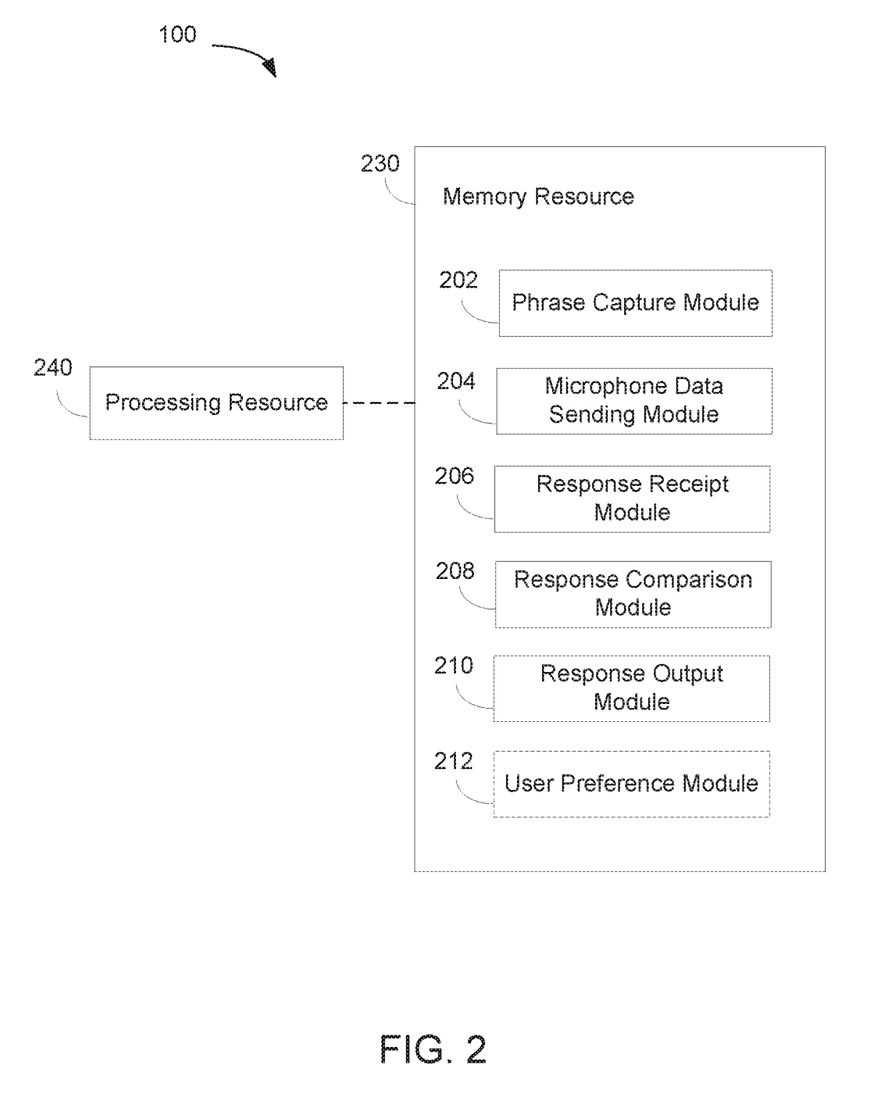
FIG. 2 is a block diagram depicting a memory resource and a processing resource to implement examples of an apparatus for communication utilizing multiple virtual assistant services.

FIGS. 1 and 2 depict examples of physical and logical components for implementing various examples. In FIG. 1 various components are identified as engines 102, 104, 106, 108, 110 and 112. In describing engines 102-112 focus is on each engine's designated function. However, the term engine, as used herein, refers generally to a combination of hardware and programming to perform a designated function. As is illustrated later with respect to FIG. 2, the hardware of each engine, for example, may include one or both of a processor and a memory, while the programming may be code stored on that memory and executable by the processor to perform the designated function.

FIG. 1 is a block diagram depicting components of a communication apparatus 100 to enable communication utilizing multiple virtual assistant services. In this example, communication apparatus 100 includes a microphone 114 and a speaker 116. As used herein, a "microphone" refers generally to any device converting sound waves into electrical energy variations, which may then be recorded or otherwise captured, amplified, or transmitted. As used herein, a "speaker" refers generally to any device that is to convert a received electrical audio signal into a corresponding sound. In examples, communication apparatus 100 may include an interface. As used herein, an "interface" at a communication apparatus refers generally to any combination of hardware and software that facilitates connection with another computing device via network. In examples wherein the network is a wireless network, the interface may be a network interface controller which connects to a radio-based computer network. Interface options for wireless networks include, but are not limited to, a USB dongle with a wireless network interface device, a Bluetooth™ interface card, or an infrared interface module. Alternatively, in an example in which the network is a wired network, the interface might be a token ring or Ethernet.

In this example, communication apparatus 100 includes a phrase capture engine 102, microphone data sending engine 104, response receipt engine 106, response comparison engine 108, response output engine 110, and user preference engine 112. In performing their respective functions, engines 102-112 may access a data repository, e.g., a memory accessible to communication apparatus 100 that can be used to store and retrieve data.

In an example, phrase capture engine 102 represents generally a combination of hardware and programming to capture, utilizing the microphone 114 at the communication apparatus, data that is indicative of a user spoken phrase detected at the microphone ("microphone data"). As used herein, to "capture" data refers generally to collect or receive information and change the collected information into a form that can be read and used by a computer. A "phrase" refers generally to a set of words (i.e. one or more words) that function as a unit or constituent to convey a thought or concept. As used herein a "word" refers generally to a meaningful element of speech or writing, typically to communicate a thought or concept.

Microphone data sending engine 104 represents generally a combination of hardware and programming to send, indirectly or directly, at least a portion of the microphone data to a set of server systems wherein each server system hosts a distinct virtual assistant service. As used herein, a "virtual assistant" or "virtual assistant service" refers generally to an application or other computer program that uses artificial intelligence to perform tasks or services for a user via a smartphone, notebook computer, desktop computer, or other computing device that is in electronic connection with the server system hosting the service. In examples, the tasks or services are performed based on user input, location awareness, and the ability to access information from a variety of online sources (such as weather or traffic conditions, news, stock prices, user schedules, retail prices, etc.). The virtual assistant service hosted at the server system can then process and/or analyze the at least a portion of the microphone data to determine a user question or inquiry that was spoken to the communication apparatus. The virtual assistant service may then determine a response phrase for the question or inquiry, e.g., by accessing applications (e.g., search applications, weather applications, sports score applications, etc.) and/or by accessing the internet. The server system may then send the determined response phrase, indirectly or directly, to the communication apparatus via a network.

As used herein, a first virtual assistant service that is "distinct" from a second virtual assistant service refers generally to the first and second virtual assistant services being recognizably different to a user. In certain examples, virtual assistants might be distinct from each other by virtue of the different product names or marks, service names or marks, or brands associated with the virtual assistant services. In other examples, virtual assistants might be distinct from each other by virtue of the different companies or individuals known to provide such virtual assistant services. In other examples, virtual assistants might be distinct from each other by virtue of different proprietary or default trigger words that are to wake up the virtual assistants when spoken by a user.

Response receipt engine 106 represents generally a combination of hardware and programming to receive, indirectly or directly, a response phrase from each server system of the set of server systems. Each response phrase received from a server system is a phrase that was determined utilizing the virtual assistant service hosted by the server system.

In a first example of microphone data sending engine 104 and response receipt engine 106, microphone data sending engine 104 may send at least a portion of the microphone data to a set of computing devices, wherein each of the computing devices is to communicate with a server system hosting a distinct virtual assistant service. In this first example, the virtual assistant services hosted by the server systems will determine response phrases based upon the microphone data, and will in turn send the response phrases to the computing devices for the computing devices to send to the communication apparatus. Continuing with this first example, response receipt engine 106 is to receive a virtual assistant-determined response phrase from each computing device of the set of computing devices.

In a second example of microphone data sending engine 104 and response receipt engine 106, microphone data sending engine 104 and the response receipt engine 106 may be constructed to enable direct communication between the communication apparatus 100 and the server systems hosting the virtual assistant services, without any need for intermediary computing devices. In this second example, microphone data sending engine 104 may send at least a portion of the microphone data to a set of server systems, wherein each server system hosts a distinct virtual assistant service. In this second example, the virtual assistant services hosted by the server systems may determine response phrases based upon the microphone data, and the server systems will in turn send the response phrases to the communication apparatus. Continuing with this second example, response receipt engine 106 is to receive from each server system a response phrase determined at the virtual assistant service hosted by the server system.

Response comparison engine 108 represents generally a combination of hardware and programming to identify a preferred response phrase among the set of received response phrases according to the preference rule. As used herein, a "preference rule" refers generally to a rule or algorithm that can be used to prioritize a first response phrase over a second response phrase in consideration of attributes of the first and second response phrases. In some example, response comparison engine 108 in identifying the preferred response phrase may assign scores to the received response phrases according to the preference rule.

In one example, response comparison engine 108 may utilize a preference rule that considers whether received response phrases are determined to be successful in providing information relevant to the user spoken phrase, or are determined to fail to provide information relevant to the user spoken phrase. For instance, according to an example preference rule, a received response phrase determined to be successful in providing information relevant to the user spoken phrase is to be assigned a higher preference than a received response phrase that has been determined as failing to provide information relevant to the user spoken phrase.

In certain examples, response comparison engine 108 may make determinations of success or failure of received response phrases in providing information that is relevant to the user spoken phrase. In other examples, the determinations of success or failure of received response phrases to provide information relevant to the user spoken phrase are made by a computing device or computing devices other than communication apparatus 100, and the determinations may be stored upon a media as response phrase success data. In this latter example, response comparison engine 108 may access the stored response phrase success data in applying the preference rules.

In some examples, the success or failure of the first and second response phrases may be determined utilizing a salient response algorithm. As used herein, a "salient response algorithm" refers generally to a set of rules or an algorithm that can be applied to a string or a phrase to make a determination as to the string's or the phrase's success or failure in providing information. For instance, an example salient response algorithm may rate a "Here are five top news stories this week" response phrase as failing to provide information relevant to a user spoken phrase "What is today's big news?". In another example, a salient response algorithm may rate a "Here is the news article of the day with the most internet activity" response phrase as highly successful in providing information relevant to the user spoken phrase "What is today's big news?".

In another example, response comparison engine 108 may identify a preferred response phrase among the set of received response phrases according to a preference rule, wherein the according to the preference rule a received response phrase indicative of an error message is to be assigned a lower preference than a preference that would be assigned to a received response phrase not indicative of an error message. For instance, where the user spoken phrase is "Who won the Broncos game?", response comparison engine 108 may identify a first response phrase from a first virtual assistant that is "I do not understand the question" as having a lower preference than a second response phrase from a second virtual assistant that is "The Broncos defeated the Raiders 28-7 in last night's game." In other examples, a received response phrase that requests additional information (e.g., "Are you referring to bronco horses?" or "What is the date of the game?" or "What type of game?") might be considered error messages.

In another example, response comparison engine 108 may identify a preferred response phrase among the set of received response phrases according to a preference rule, wherein the preference rule includes as a factor past predictive success of virtual assistant services with respect to a subject category. For instance, where the user spoken phrase is "Will there be rain tomorrow?", comparison engine 108 may identify a first response phrase from a first virtual assistant that is determined to have a 55% accuracy rating with respect to weather questions as having a higher preference than a second response phrase from a second virtual assistant that is that is determined to have a 35% accuracy rating with respect to weather questions.

In certain examples communication apparatus 100 may include a user preference engine 112. User preference engine 112 represents generally a combination of hardware and programming to capture preference data indicative of a user preference for a first virtual assistant service relative to one or more other virtual assistant services. Response comparison engine 108 is to in turn identify the preferred response phrase in consideration of such user preference. In examples, the user preference data may be indicative of a category-specific user preference for a virtual assistant service. In other examples, the user preference data may be indicative of a general user preference for a virtual assistant service, the preference applying to all categories of user spoken phrases and/or requests.

In certain examples, the user preference data may be data that is captured, utilizing the microphone 114, at the communication apparatus 100 as a user speaks a preference phrase in a vicinity of the microphone 114. In other examples, the user preference data may be data indicative of a user's past choice of a particular virtual assistant services for a particular category of user spoken phrases. For instance, an example user preference engine 112 may capture preference data indicative that a particular user had initiated thirty voice transactions with a first virtual assistant service inquiring as to health and wellness issues, while that user had initiated such voice transactions with a second virtual assistant ten times, and with a third virtual assistant service only three times. In another example, user preference engine 112 may capture preference data indicative a recency of voice transactions with particular virtual assistant services for a particular category of user spoken phrases. For instance, an example user preference engine 112 may capture preference data indicative that a particular user had initiated fifteen voice transactions with a first virtual assistant service inquiring as to legal issues during the previous three months, and had initiated five voice transactions with a second virtual assistant service during a current month.

Response output engine 110 represents generally a combination of hardware and programming to cause output, via the speaker 116, of the preferred response phrase that was identified by response comparison engine 108.

In examples, microphone data sending engine 104 may send the at least a portion of the microphone data to the set of computing devices over a link via a networking protocol. In other examples, response receipt engine 106 may receive the virtual assistant-determined response phrases from computing devices over a link via a networking protocol, wherein the computing devices are connected to server systems that host the virtual assistant services via networking protocols. In other examples, response receipt engine 106 may receive the response phrases directly from the server systems hosting the virtual assistant services over a link via a networking protocol. In examples the networking protocols may include, but are not limited to, Transmission Control Protocol/Internet Protocol ("TCP/IP"), HyperText Transfer Protocol ("HTTP"), and/or Session Initiation Protocol ("SIP").

As used herein, a "link" refers generally to an infrastructure or combination of infrastructures to enable an electronic connection, wireless connection, other connection, or combination thereof, to enable data communication between components and/or computing devices. Such infrastructure or infrastructures may include, but are not limited to, a cable, wireless, fiber optic, or remote connections via telecommunication link, an infrared link, or a radio frequency link. For example, a "link" may refer to or represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

In the foregoing discussion of FIG. 1, engines 102-112 were described as combinations of hardware and programming. Engines 102-112 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement communication apparatus 100 of FIG. 1.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement communication apparatus 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

In FIG. 2, the executable program instructions stored in memory resource 230 are depicted as phrase capture module 202, microphone data sending module 204, response receipt module 206, response comparison module 208, response output module 210, and user preference module 212. Phrase capture module 202 represents program instructions that when executed by processing resource 240 may perform any of the functionalities described above in relation to phrase capture engine 102 of FIG. 1. Microphone data sending module 204 represents program instructions that when executed by processing resource 240 may perform any of the functionalities described above in relation to microphone data sending engine 104 of FIG. 1. Response receipt module 206 represents program instructions that when executed by processing resource 240 may perform any of the functionalities described above in relation to response receipt engine 106 of FIG. 1. Response comparison module 208 represents program instructions that when executed by processing resource 240 may perform any of the functionalities described above in relation to response comparison engine 108 of FIG. 1. Response output module 210 represents program instructions that when executed by processing resource 240 may perform any of the functionalities described above in relation to response output engine 110 of FIG. 1. User preference module 212 represents program instructions that when executed by processing resource 240 may perform any of the functionalities described above in relation to user preference engine 112 of FIG. 1.

Figure 3:
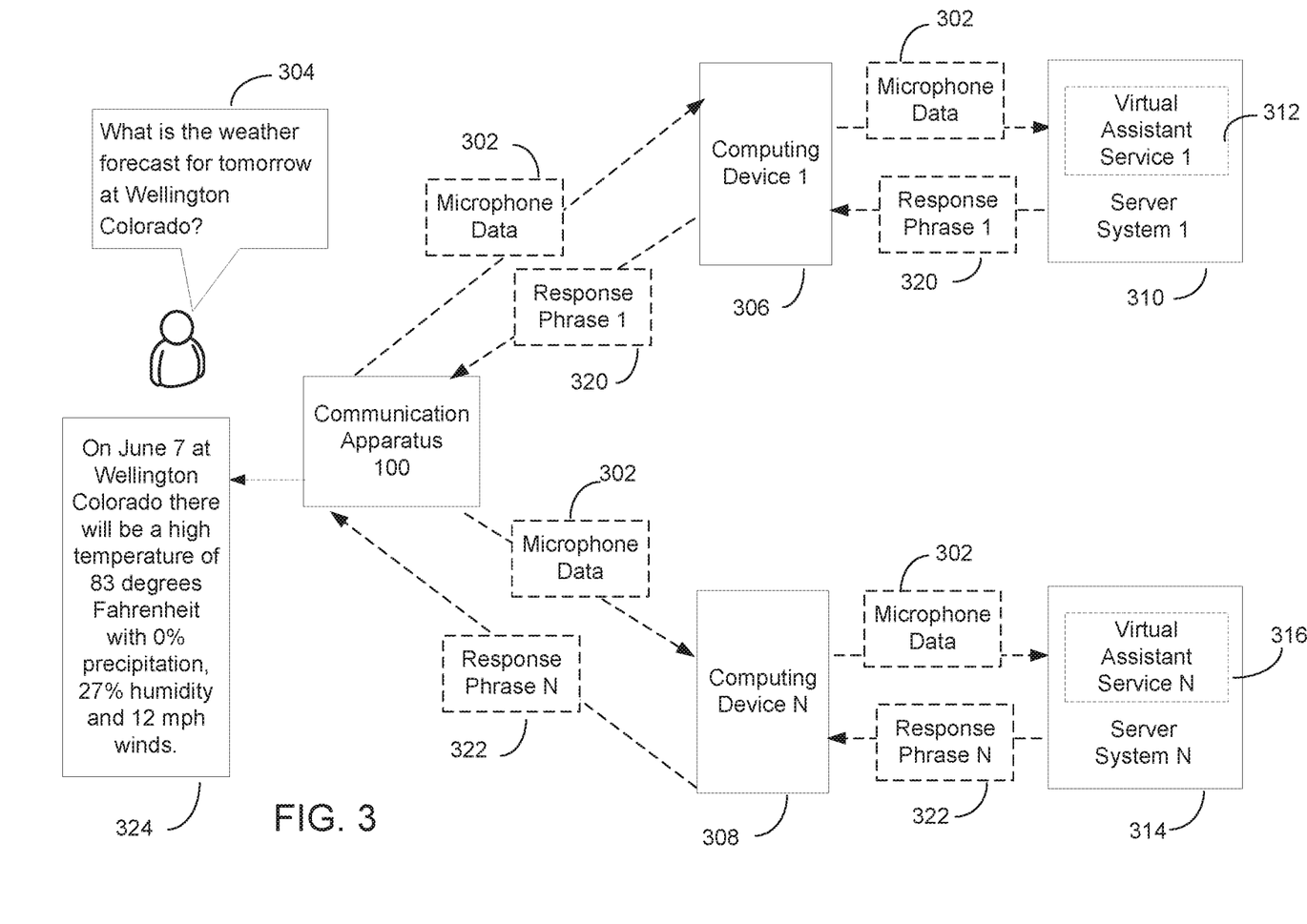
FIG. 3 illustrates an example of a communication utilizing multiple virtual assistant services.

FIG. 3, in view of FIGS. 1, and 2, illustrates an example of communication utilizing multiple virtual assistant services. In an example, communication apparatus 100 may capture, utilizing a microphone that is included with the communication apparatus 100, microphone data 302 that is indicative of a user spoken phrase 304. For instance, a user may speak a phrase "What is the weather forecast for tomorrow at Wellington Colorado?" In this example, communication apparatus 100 would, upon capturing the microphone data 302 relating to the detected user spoken phrase 304, send at least a portion of the microphone data 302 to a set of computing devices including computing device 1 306 and computing device N 308. Each of computing device 1 306 and computing device N 308 is electronically connected to communication apparatus 100 via a link, and is to communicate with a server system that hosts a distinct virtual assistant service. In a particular example, computing device 1 may be a mobile computing device that is a smartphone and computing device 2 may be a laptop computer. In particular examples, the electronic connection between communication apparatus 100 and each of computing device 1 and computing device N may be a Bluetooth connection, near-field communication connection, infrared connection, or any other wireless connection. In this example of FIG. 3, computing device 1 is to communicate with server system 1 310 that hosts a virtual assistant service 1 312, and computing device N is to communicate with a server system N 314 that hosts a virtual assistant service N 316.

Virtual assistant service 1 312 hosted at server system 1 310 may process and/or analyze the portion of the microphone data 302 received at server system 1 to determine a user question or inquiry that was spoken to the communication apparatus 100. Virtual assistant service 1 may then determine a response phrase 1 320 for the question or inquiry, e.g., by accessing applications (e.g., search applications, a weather-specific applications, etc.) and/or by accessing the internet. Server system 1 may then send a determined response phrase 1 320 to computing device 1 306 via a link. Computing device 1 is to in turn send response phrase 1 to communication apparatus 100 via a link.

Continuing at FIG. 3, virtual assistant service N 316 hosted at server system N 314 may process and/or analyze the portion of the microphone data 302 received at server system N to determine a user question or inquiry that was spoken to the communication apparatus 100. Virtual assistant service N may then determine a response phrase N 322 for the question or inquiry, e.g., by accessing applications (e.g., search applications, a weather-specific applications, etc.) and/or by accessing the internet. Server system N may then send the determined response phrase N 322 to computing device N 308 via a link. Computing device N is to in turn send response phrase 1 to communication apparatus 100 via a link.

Communication apparatus 100 may receive from each of the computing devices of the set, a response phrase determined at a virtual assistant service. In this example, communication apparatus 100 is to receive a response phrase 1 320 from computing device 1 306, and is to receive a response phrase N 322 from computing device N 308

Continuing at FIG. 3, communication apparatus 100 is to identify a preferred response phrase among the set of received response phrases according to a preference rule. In this example, communication apparatus 100 utilizes one or more preference rules to identify response phrase 1 as the preferred response phrase 324 ("On June 7 at Wellington Colo. there will be a high temperature of 8 degrees Fahrenheit with 0% precipitation, 27% humidity, and 12 mph winds").

In examples, communication apparatus 100 may identify the preferred response phrase by assigning scores to the received response phrases according to the preference rule. For instance, response phrase 1 320 that was identified as the preferred response phrase 324 may have been assigned a score higher than response phrase N 322.

Continuing at FIG. 3, in examples, according to the utilized preference rule a received response phrase that is determined to be successful in providing information relevant to the user spoken phrase is assigned a higher preference than a received response phrase that has been determined as failing to provide information relevant to the user spoken phrase. For instance, response phrase 1 320 that was identified as the preferred response phrase 324 may have been determined to be more successful in providing information than response phrase N 322. In particular examples, determining success or failure of received response phrase 1 320 and received response phrase N 322 in providing information that is relevant to the user spoken phrase 304 may include applying a salient response algorithm.

In examples, according to the utilized preference rule a received response phrase indicative of an error message is to be assigned a lower preference than a preference that would be assigned to a received response phrase not indicative of an error message. For instance, response phrase 1 320 that was identified as the preferred response phrase 324 may have been determined a non-error message, while response phrase N 322 may have been determined to be an error message.

In examples, the preference rule that is utilized in identifying the preferred response may include as a factor a past predictive success of virtual assistant services with respect to a subject category. In this example, communication apparatus 100 may identify the preferred response phrase 324 utilizing a preference rule that considers the successes (or failures) of previous weather prediction responses that were determined by virtual assistant service 1 312 and virtual assistant service N 316.

Continuing at FIG. 3, communication apparatus 100 is to cause an aural output, via a speaker component, of the preferred response phrase 324.

Figure 4:
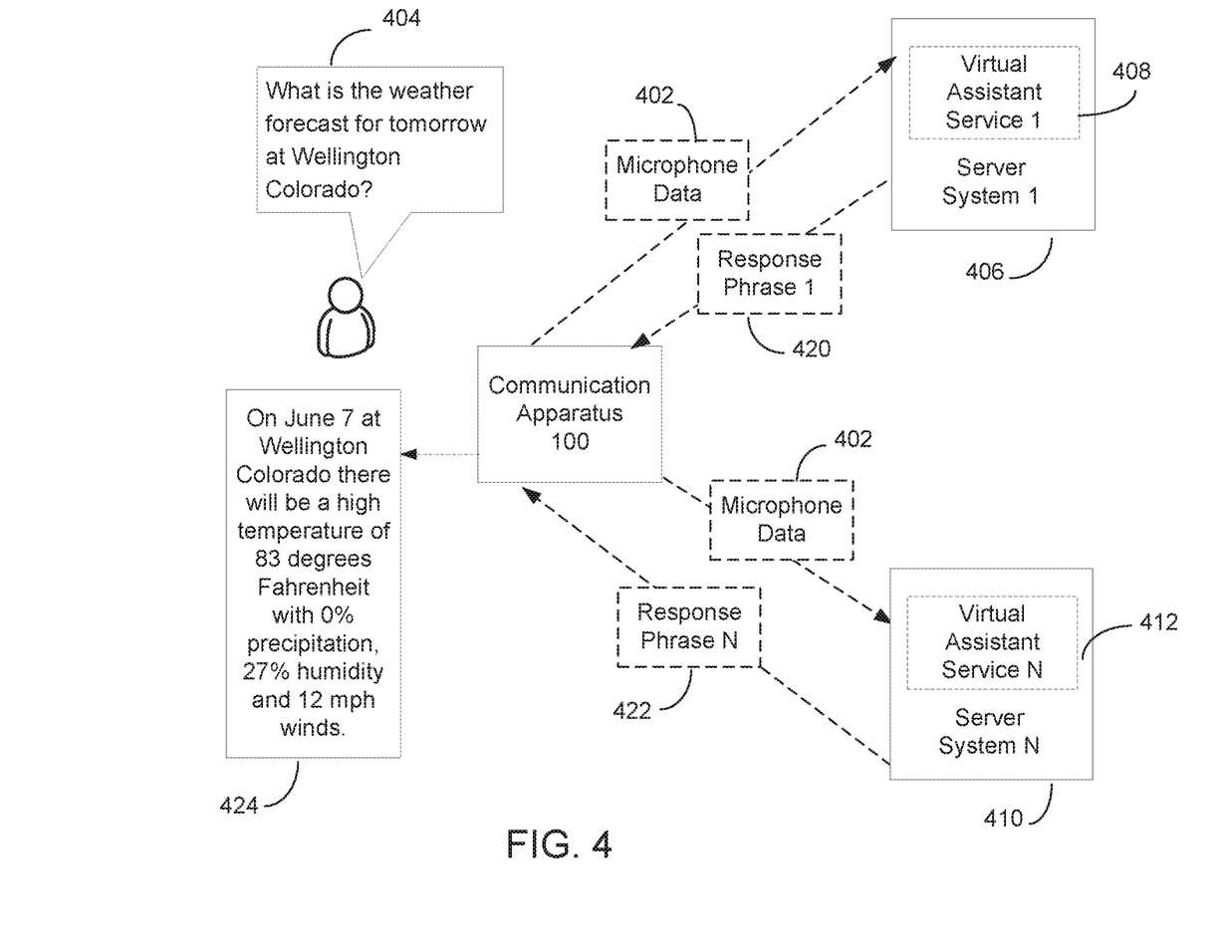
FIG. 4 illustrates another example of a communication utilizing multiple virtual assistant services.

FIG. 4, in view of FIGS. 1, and 2, illustrates another example of communication utilizing multiple virtual assistant services. In an example, communication apparatus 100 may capture, utilizing a microphone 114 (FIG. 1) that is included with the communication apparatus 100, microphone data 402 that is indicative of a user spoken phrase 404. Communication apparatus 100, after capturing the microphone data 402 relating to the detected user spoken phrase 404, sends at least a portion of the microphone data 402 to a set of server systems wherein each server system hosts a separate virtual assistant service. In this example the set of server systems includes server system 1 406 that hosts virtual assistant service 1 408, and server system N 410 that hosts virtual assistant service N 412. Each of server system 1 406 and server system N 410 is electronically connected to communication apparatus 100 via a link. In examples the link may be a network, such as an internet or intranet.

Virtual assistant service 1 408 hosted at server system 1 406 may process and/or analyze the portion of the microphone data 402 received at server system 1 406 to determine the user spoken phrase 404 that was spoken in the vicinity of communication apparatus 100. Virtual assistant service 1 408 may then determine a response phrase 1 420 for the question or inquiry, e.g., by accessing applications (e.g., search applications, a weather-specific applications, etc.) and/or by accessing the internet. Server system 1 may then send a determined response phrase 1 420 to communication apparatus 100 via the link.

Continuing at FIG. 4, virtual assistant service N 412 hosted at server system N 410 may process and/or analyze the portion of the microphone data 402 received at server system N 410 to determine the user spoken phrase 404 that was detected by communication apparatus 100. Virtual assistant service N 412 may then determine a response phrase N 422 for user spoken phrase 404, e.g., by accessing applications (e.g., search applications, a weather-specific applications, etc.) and/or by accessing the internet. Server system N 410 may then send the determined response phrase N 422 to communication apparatus 100 via the link.

Communication apparatus 100 may receive from each of the server systems of the set, a response phrase determined at a virtual assistant service. In this example, communication apparatus 100 is to receive response phrase 1 420 from server system 1406, and is to receive response phrase N 422 from server system N 410.

Continuing at FIG. 4, communication apparatus 100 is to identify a preferred response phrase 424 among the set of received response phrases according to a preference rule. Communication apparatus 100 in turn causes the preferred response phrase 424 to be audibly presented or broadcast via a speaker included within the communication apparatus.

Figure 5:
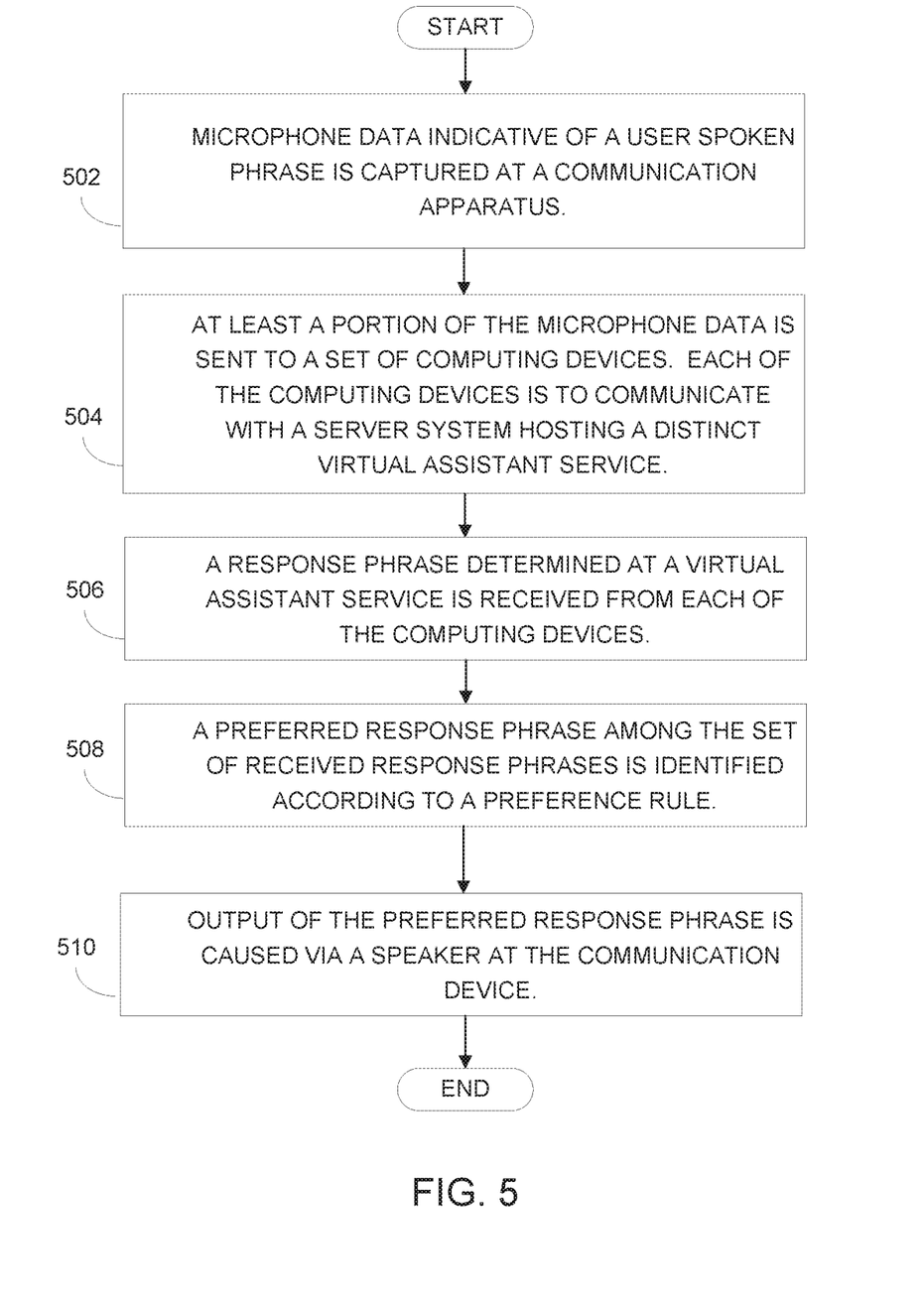
FIG. 5 is a flow diagram depicting implementation of an example of a communication method utilizing multiple virtual assistant services, the method including sending microphone data to a set of computing devices, wherein each of the computing devices is to communicate with a server system hosting a virtual assistant service.

FIG. 5 is a flow diagram of implementation of a communication method utilizing multiple virtual assistant services. In discussing FIG. 5, reference may be made to the components depicted in FIGS. 1 and 2. Such reference is made to provide contextual examples and not to limit the manner in which the method depicted by FIG. 5 may be implemented. Microphone data indicative of a user spoken phrase is captured at a communication apparatus (block 502). Referring back to FIGS. 1 and 2, phrase capture engine 102 (FIG. 1) or phrase capture module 202 (FIG. 2), when executed by processing resource 240, may be responsible for implementing block 502.

At least a portion of the microphone data is sent to a set of computing devices. Each of the computing devices is to communicate with a server system hosting a distinct virtual assistant service (block 504). Referring back to FIGS. 1 and 2, microphone data sending engine 104 (FIG. 1) or microphone data sending module 204 (FIG. 2), when executed by processing resource 240, may be responsible for implementing block 504.

A response phrase determined at a virtual assistant service is received from each of the computing devices (block 506). Referring back to FIGS. 1 and 2, response receipt engine 106 (FIG. 1) or response receipt module 206 (FIG. 2), when executed by processing resource 240, may be responsible for implementing block 506.

A preferred response phrase among the set of received response phrases is identified according to a preference rule (block 508). Referring back to FIGS. 1 and 2, response comparison engine 108 (FIG. 1) or response comparison module 208 (FIG. 2), when executed by processing resource 240, may be responsible for implementing block 508.

Output of the preferred response phrase is caused via a speaker at the communication device (block 510). Referring back to FIGS. 1 and 2, response output engine 110 (FIG. 1) or response output module 210 (FIG. 2), when executed by processing resource 240, may be responsible for implementing block 510.

Figure 6:
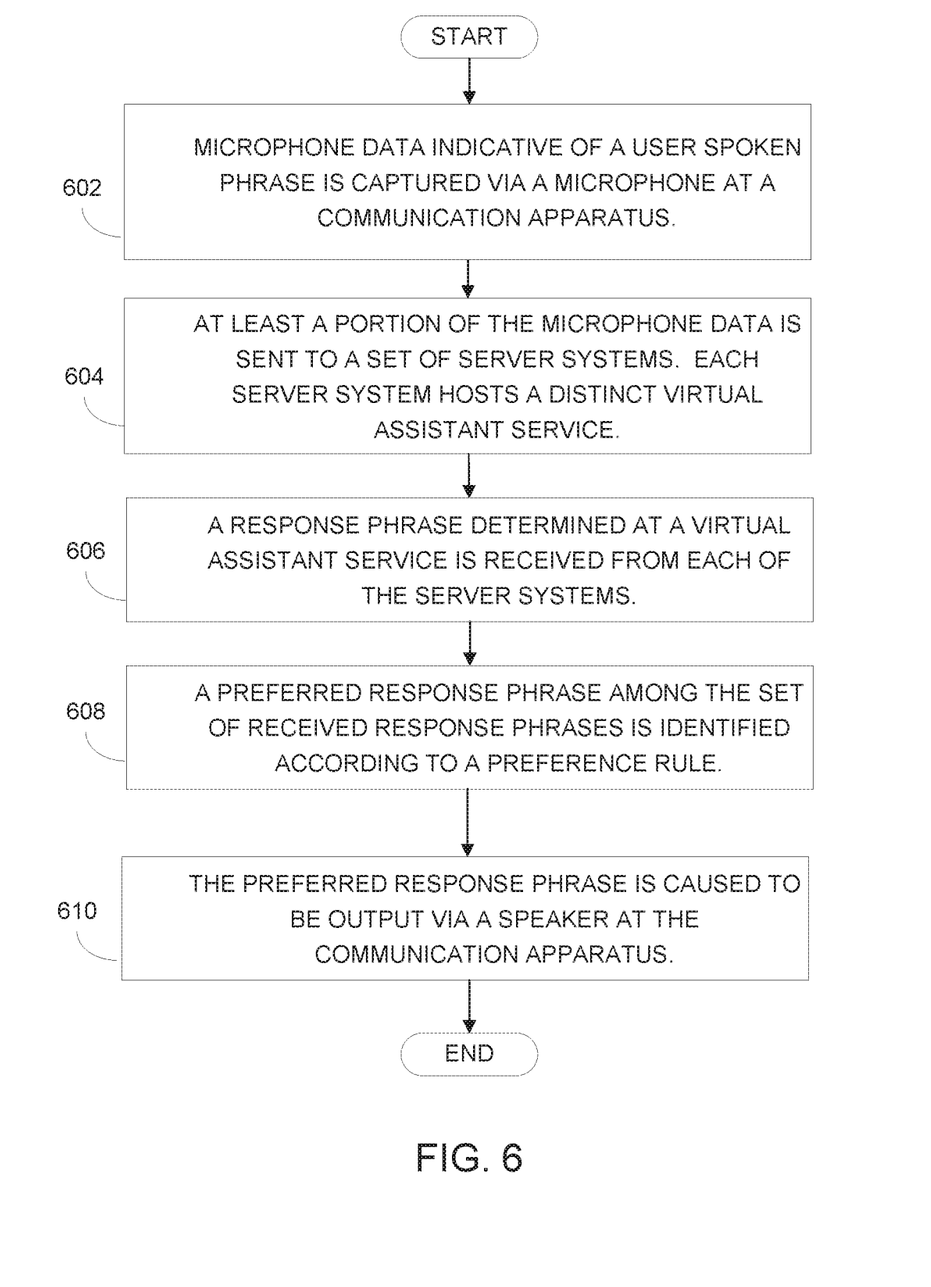
FIG. 6 is a flow diagram depicting implementation of an example of a communication method utilizing multiple virtual assistant services, the method including sending microphone data to a set of server systems, wherein each server system hosts a virtual assistant service.

FIG. 6 is a flow diagram of implementation of a communication method utilizing multiple virtual assistant services. In discussing FIG. 6, reference may be made to the components depicted in FIGS. 1 and 2. Such reference is made to provide contextual examples and not to limit the manner in which the method depicted by FIG. 6 may be implemented. Microphone data indicative of a user spoken phrase is captured via a microphone at a communication apparatus (block 602). Referring back to FIGS. 1 and 2, phrase capture engine 102 (FIG. 1) or phrase capture module 202 (FIG. 2), when executed by processing resource 240, may be responsible for implementing block 602.

At least a portion of the microphone data is sent to a set of server systems. Each server system hosts a distinct virtual assistant service (block 604). Referring back to FIGS. 1 and 2, microphone data sending engine 104 (FIG. 1) or microphone data sending module 204 (FIG. 2), when executed by processing resource 240, may be responsible for implementing block 604.

A response phrase determined at a virtual assistant service is received from each of the server systems (block 606). Referring back to FIGS. 1 and 2, response receipt engine 106 (FIG. 1) or response receipt module 206 (FIG. 2), when executed by processing resource 240, may be responsible for implementing block 606.

A preferred response phrase among the set of received response phrases is identified according to a preference rule (block 608). Referring back to FIGS. 1 and 2, response comparison engine 108 (FIG. 1) or response comparison module 208 (FIG. 2), when executed by processing resource 240, may be responsible for implementing block 608.

The preferred response phrase is caused to be output via a speaker at the communication apparatus (block 610). Referring back to FIGS. 1 and 2, response output engine 110 (FIG. 1) or response output module 210 (FIG. 2), when executed by processing resource 240, may be responsible for implementing block 610.

Figure 7:
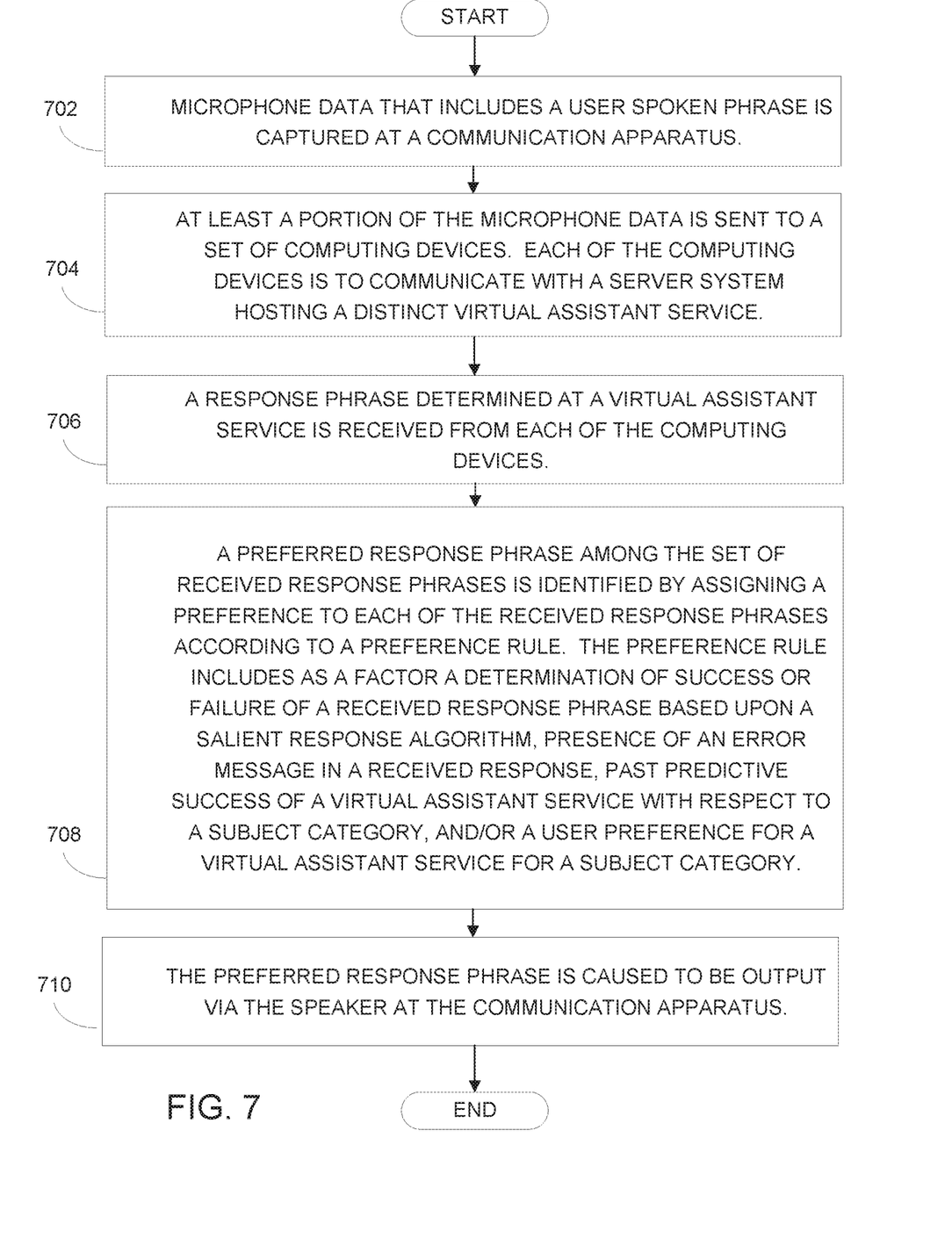
FIG. 7 is a flow diagram depicting implementation of an example of a communication method utilizing multiple virtual assistant services.

FIG. 7 is a flow diagram of implementation of a communication method utilizing multiple virtual assistant services. In discussing FIG. 7, reference may be made to the components depicted in FIGS. 1 and 2. Such reference is made to provide contextual examples and not to limit the manner in which the method depicted by FIG. 7 may be implemented. Microphone data that includes a user spoken phrase is captured at a communication apparatus (block 702). Referring back to FIGS. 1 and 2, phrase capture engine 102 (FIG. 1) or phrase capture module 202 (FIG. 2), when executed by processing resource 240, may be responsible for implementing block 702.

At least a portion of the microphone data is sent to a set of computing devices. Each of the computing devices is to communicate with a server system hosting a distinct virtual assistant service (block 704). Referring back to FIGS. 1 and 2, microphone data sending engine 104 (FIG. 1) or microphone data sending module 204 (FIG. 2), when executed by processing resource 240, may be responsible for implementing block 704.

A response phrase determined at a virtual assistant service is received from each of the computing devices (block 706). Referring back to FIGS. 1 and 2, response receipt engine 106 (FIG. 1) or response receipt module 206 (FIG. 2), when executed by processing resource 240, may be responsible for implementing block 706.

A preferred response phrase among the set of received response phrases is identified by assigning a preference to each of the received response phrases according to a preference rule. The preference rule includes as a factor a determination of success or failure of a received response phrase based upon a salient response algorithm, presence of an error message in a received response, past predictive success of a virtual assistant service with respect to a subject category, and/or a user preference for a virtual assistant service for a subject category (block 708). Referring back to FIGS. 1 and 2, response comparison engine 108 (FIG. 1) or response comparison module 208 (FIG. 2), when executed by processing resource 240, may be responsible for implementing block 708.

The preferred response phrase is caused to be output via the speaker at the communication apparatus (block 710). Referring back to FIGS. 1 and 2, response output engine 110 (FIG. 1) or response output module 210 (FIG. 2), when executed by processing resource 240, may be responsible for implementing block 710.

FIGS. 1-7 aid in depicting the architecture, functionality, and operation of various examples. In particular, FIGS. 1 and 2 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function (s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 5-7 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A communication apparatus comprising:
   a speaker;
   a microphone;
   a phrase capture engine, to capture, utilizing the microphone, microphone data indicative of a user spoken phrase;
   a microphone data sending engine, to send at least a portion of the microphone data to each of a set of computing devices, wherein each of the computing devices is associated with a distinct virtual assistant service and is to communicate with a server system hosting the distinct virtual assistant service;
   a response receipt engine, to receive from each of the computing devices a response phrase determined at the virtual assistant service with which the computing device is associated;
   a response comparison engine, to identify a preferred response phrase among the set of received response phrases according to a preference rule; and
   a response output engine to cause output, via the speaker, of the preferred response phrase.

2. The communication apparatus of claim 1, wherein the response comparison engine is to identify the preferred response phrase by assigning scores to the received response phrases according to the preference rule.

3. The communication apparatus of claim 1, wherein according to the preference rule a received response phrase determined to be successful in providing information relevant to the user spoken phrase is assigned a higher preference than a received response phrase that has been determined as failing to provide information relevant to the user spoken phrase.

4. The communication apparatus of claim 3, wherein success or failure of a received response phrase to provide information relevant to the user spoken phrase is determined based upon a salient response algorithm.

5. The communication apparatus of claim 1, wherein according to the preference rule a received response phrase indicative of an error message is to be assigned a lower preference than a preference that would be assigned to a received response phrase not indicative of an error message.

6. The communication apparatus of claim 1, wherein the preference rule includes as a factor past predictive success of virtual assistant services with respect to a subject category.

7. The communication apparatus of claim 1, further comprising a user preference engine to capture preference data indicative of a user preference for a first virtual assistant service, and wherein the response comparison engine is to identify the preferred response phrase in consideration of the user preference.

8. The communication apparatus of claim 7, wherein the preference data is indicative of a user preference for a first virtual assistant service for a subject category, and wherein the response comparison engine is to identify the preferred response phrase in consideration of the user preference.

9. A memory resource storing instructions that when executed cause a processing resource to effect communication between a communication apparatus and a computing device, the instructions comprising:
   a phrase capture module that when executed causes the processing resource to capture at a communication apparatus including a speaker and a microphone, microphone data indicative of a user spoken phrase;
   a microphone data sending module that when executed causes the processing resource to send at least a portion of the microphone data to each of a set of computing devices,
   wherein each of the computing device is associated with a distinct virtual assistant service and is to communicate with a server system hosting the distinct virtual assistant service;
   a response receipt module that when executed causes the processing resource to receive from each of the computing devices a response phrase determined at the virtual assistant service with which the computing device is associated;
   a response comparison module that when executed causes the processing resource to identify a preferred response phrase among the set of received response phrases according to a preference rule; and
   a response output module that when executed causes the processing resource to cause output, via the speaker, of the preferred response phrase.

10. The memory resource of claim 9, wherein the response comparison module when executed causes the processing resource to identify the preferred response phrase by assigning scores to the received response phrases according to the preference rule.

11. The memory resource of claim 9, wherein according to the preference rule a received response phrase that has a higher saliency rating according to a salient response algorithm is to be assigned a higher score than a received response phrase that has a lower saliency rating.

12. The memory resource of claim 9, wherein according to the preference rule a received response phrase that is indicative of an error, or that has an associated error message or error code, is to be assigned a lower score than a score that would be assigned to a received response phrase that is not indicative of an error message.

13. The memory resource of claim 9, further comprising a user preference module that when executed causes the processing resource to capture preference data indicative of a user preference for a first virtual assistant service, and wherein the response comparison module when executed causes the processing resource to identify the preferred response phrase in consideration of the user preference.

14. The memory resource of claim 13, wherein the preference data is indicative of a user preference for a first virtual assistant service for a subject category, and wherein the response comparison module when executed causes the processing resource to identify the preferred response phrase in consideration of the user preference.

15. A communication method, comprising:
capturing at a communication apparatus microphone data, the microphone data including a user spoken phrase;
sending at least a portion of the microphone data to a set of computing devices, wherein each of the computing devices is to communicate with a server system hosting a distinct virtual assistant service;
receiving from each of the computing devices a response phrase determined at a virtual assistant service;
identifying a preferred response phrase among the set of received response phrases by assigning a preference to each of the received response phrases according to a preference rule, wherein the preference rule includes as a factor at least one from the set of
success or failure of a received response phrase determined based upon a salient response algorithm,
presence of an error message in a received response;
past predictive success of a virtual assistant service with respect to a subject category, and
a user preference for a virtual assistant service for a subject category; and
causing output, via a speaker, of the preferred response phrase.

* * * * *